US008009650B2

(12) United States Patent
Rybak et al.

(10) Patent No.: US 8,009,650 B2
(45) Date of Patent: *Aug. 30, 2011

(54) HANDLING ATTACHMENT CONTENT ON A MOBILE DEVICE

(75) Inventors: Rafal Rybak, Waterloo (CA); Kenneth J. Liang, Ottawa (CA); Arun Munje, Ottawa (CA); Rodney D. Bylsma, Poway, CA (US)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/891,456

(22) Filed: Sep. 27, 2010

(65) Prior Publication Data

US 2011/0014934 A1 Jan. 20, 2011

Related U.S. Application Data

(63) Continuation of application No. 12/488,769, filed on Jun. 22, 2009, now Pat. No. 7,809,383, which is a continuation of application No. 11/314,023, filed on Dec. 22, 2005, now Pat. No. 7,567,542.

(60) Provisional application No. 60/637,768, filed on Dec. 22, 2004.

(51) Int. Cl.
*H04Q 7/24* (2006.01)

(52) U.S. Cl. ........................................ 370/338; 709/206

(58) Field of Classification Search ......................... None
See application file for complete search history.

(56) References Cited

U.S. PATENT DOCUMENTS

| 6,052,735 | A | 4/2000 | Ulrich et al. |
| 6,256,666 | B1 | 7/2001 | Singhal |
| 6,598,076 | B1 * | 7/2003 | Chang et al. ................. 709/206 |
| 6,721,804 | B1 | 4/2004 | Rubin et al. |
| 7,567,542 | B2 | 7/2009 | Rybak et al. |
| 7,809,383 | B2 | 10/2010 | Rybak et al. |
| 2002/0174010 | A1 | 11/2002 | Rice, III |
| 2003/0208546 | A1 * | 11/2003 | DeSalvo et al. ............... 709/206 |
| 2004/0139397 | A1 | 7/2004 | Yuan et al. |

FOREIGN PATENT DOCUMENTS

| EP | 1638015 | 3/2006 |
| EP | 1708098 | 4/2006 |
| WO | 03005276 | 1/2003 |

OTHER PUBLICATIONS

Notification Concerning Informal Communication With The Applicant for corresponding International application No. PCT/CA2005/001958, date of mailing, Mar. 2, 2007.
International Search Report/Written Opinion for corresponding international application PCT/CA2005/001958, date of mailing Apr. 20, 2006.
International Preliminary Report on Patentability (IPRP) for corresponding international patent application No. PCT/CA2005/001958 date of mailing Apr. 24, 2007.

* cited by examiner

*Primary Examiner* — Phuoc Doan
(74) *Attorney, Agent, or Firm* — Novak Druce + Quigg LLP

(57) ABSTRACT

Embodiments described herein provide a user with the ability to download a selected attachment document that is associated with a message received on a mobile device. Attachment data corresponding to the selected attachment document can be downloaded according to at least one of a native application attachment content handling option and a client-server attachment content handling option.

20 Claims, 7 Drawing Sheets

HANDLING ATTACHMENT CONTENT ON A MOBILE DEVICE

CROSS-REFERENCE TO RELATED APPLICATIONS

This application is a continuation of U.S. patent application Ser. No. 12/488,769, filed on Jun. 22, 2009, which is a continuation of U.S. patent application Ser. No. 11/314,023, filed on Dec. 22, 2005, which claims the benefit of U.S. Provisional Application No. 60/637,768, filed on Dec. 22, 2004. U.S. patent application Ser. No. 11/314,023 issued to patent as U.S. Pat. No. 7,567,542. The entirety of application Ser. No. 12/488,769, application Ser. No. 11/314,023 and of Application No. 60/637,768 are hereby incorporated by reference.

FIELD

The embodiments described herein relate generally to the field of wireless communication and wireless communication devices and more particularly towards handling attachment content on wireless communication devices.

BACKGROUND

Mobile devices that are used for data communication can support a variety of applications such as e-mail, web browsing, instant messaging (IM) and secure messaging systems (SMS). Handling attachment content refers to opening or downloading an attachment document associated with a message received on the mobile device. However, due to memory and bandwidth limitations, handling attachment content on mobile devices is a challenge. Accordingly, when a message with an attachment document is first sent to a mobile device, the attachment document is not sent to the mobile device. Rather, the message includes an indication that there is an associated attachment document. The user can then choose to download the attachment document. However, the user may prefer to view the attachment document in a particular manner.

BRIEF DESCRIPTION OF THE DRAWINGS

For a better understanding of the embodiments described herein and to show more clearly how it may be carried into effect, reference will now be made, by way of example only, to the accompanying drawings which show at least one exemplary embodiment in which:

FIG. 3 is a block diagram of an exemplary embodiment of a node of a wireless network that the mobile communications device of FIG. 1 may communicate with;

FIG. 4 is a block diagram of an exemplary embodiment of a host system that the mobile communications device of FIG. 1 may communicate with;

DETAILED DESCRIPTION

Figure 1:
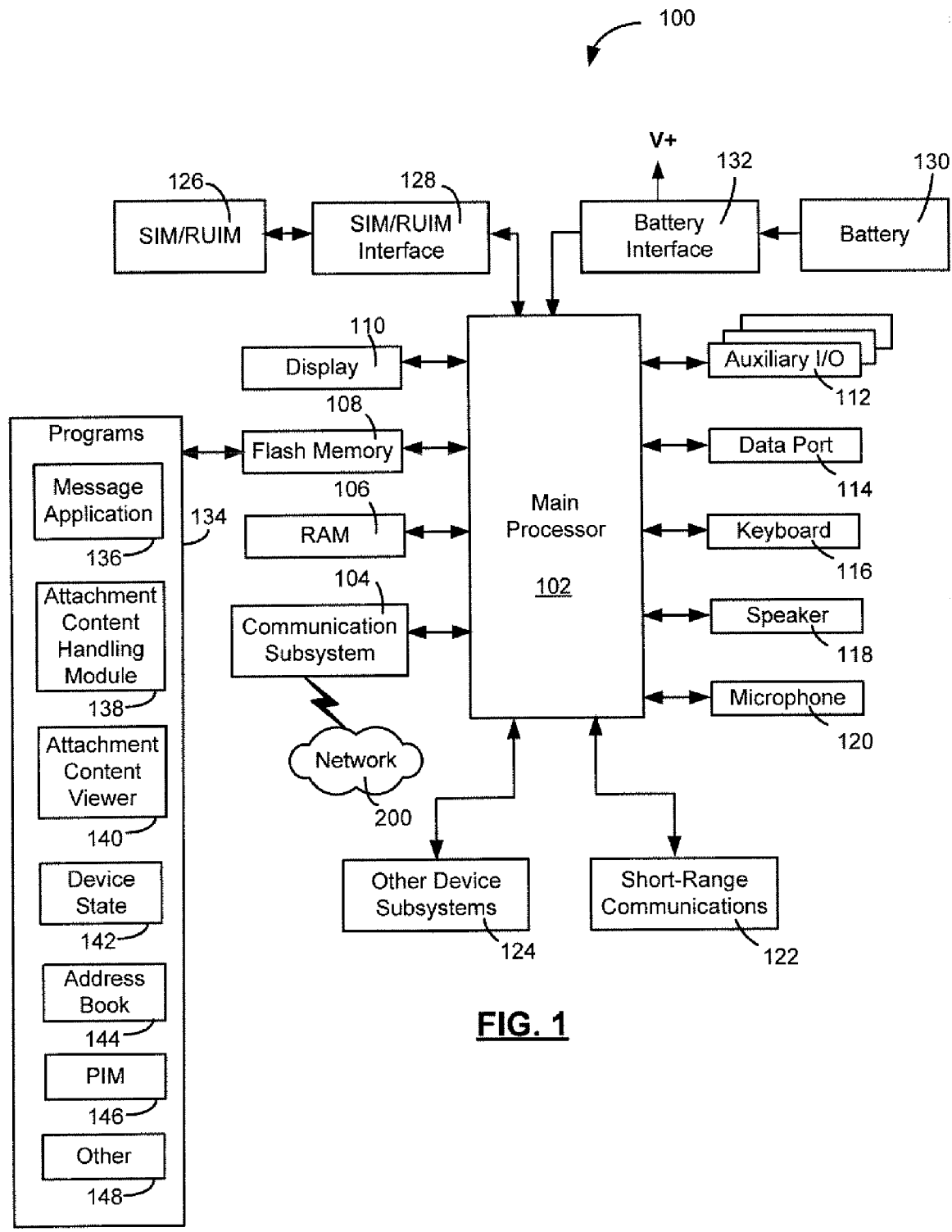
FIG. 1 is a block diagram of an exemplary embodiment of a mobile communication device.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein, but rather as merely describing the implementation of the various embodiments described herein.

The embodiments described herein generally relate to handling attachment content. To facilitate an understanding of the embodiments provided herein, the embodiments will be described in terms of handling attachment content for e-mails received on a mobile wireless communication device, hereafter referred to as a mobile device. The mobile device can send and receive wireless messages. Examples of applicable communication devices include cellular phones, cellular smart-phones, wireless organizers, personal digital assistants, computers, laptops, handheld wireless communication devices, wirelessly enabled notebook computers and the like.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device and how it communicates with other devices and host systems, reference will now be made to FIGS. 1 through 4.

Referring first to FIG. 1, shown therein is a block diagram of a mobile device 100 in one exemplary implementation. The mobile device 100 includes a number of components, the controlling component being a main processor 102 which controls the overall operation of the mobile device 100. Communication functions, including data and voice communications, are performed through a communication subsystem 104. The communication subsystem 104 receives messages from and sends messages to a wireless network 200. In this exemplary implementation of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with the mobile device 100 is a GSM/GPRS wireless network in one exemplary implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the wireless network 200, and device-resident functions such as a calculator or task list. Operating system software used by the main processor 102 is typically stored in a persistent store such as the flash memory 108, which may alternatively be a read-only memory (ROM) or similar storage element (not shown). Those skilled in the art will appreciate that the operating system, specific device applications, or parts thereof, may be temporarily loaded into a volatile store such as the RAM 106.

The mobile device 100 may send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 contains some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 is a battery-powered device and includes a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The main processor 102, in addition to its operating system functions, enables execution of software applications 134 on the mobile device 100. The subset of software applications 134 that control basic device operations, including data and voice communication applications, will normally be installed on the mobile device 100 during its manufacture.

The software applications 134 include a message application 136. The message application 136 can be any suitable software program that allows a user of the mobile device 100 to send and receive electronic messages. Various alternatives exist for the message application 136 as is well known to those skilled in the art. Messages that have been sent or received by the user are typically stored in the flash memory 108 of the mobile device 100 or some other suitable storage element in the mobile device 100. In an alternative embodiment, some of the sent and received messages may be stored remotely from the device 100 such as in a data store of an associated host system that the mobile device 100 communicates with.

Another program that is executed by the mobile device 100 provides attachment content handling. The attachment content handling module 138 operates in conjunction with the message application 136 to provide the user with attachment content handling options for received messages that indicate that there is an associated attachment document. The associated attachment document can be a text document such as a Microsoft WORD™ document, or a rich-text format document, a Microsoft Power Point™ file, a sound file, an image file, a spreadsheet file, a PDF file and the like.

The attachment content handling module 138 can provide the user with an option to select an attachment document associated with the message. In one implementation, a window can be provided that shows the attachment documents that are associated with a received e-mail message and accepts a user input for selecting one of the attachment document. The attachment content handling module 138 can also provide the user with an option for selecting attachment content handling options that are available for downloading a selected attachment document. These options include a native application attachment content handling option and a client-server attachment content handling option. These options may not be available for each attachment document. The attachment content handling options can include further sub-options.

Once the user selects an attachment document and one of the attachment content handling options, the attachment content handling module 138 generates an attachment content handling request and sends it to a remote facility which provides attachment content handling services. In some cases, the remote facility can be provided by the corporate enterprise that the mobile device 100 is associated with. In other cases, a separate third party can provide the remote facility. The remote facility can also be associated with a website accessible by the Internet. In any of these cases, the attachment content handling module 138 operates in conjunction with one or more programs that are related to sending and receiving data such as, but not limited to, the message application 136 and other applications on the mobile device 100 that facilitate connection with the wireless network 200 as is commonly known by those skilled in the art. The facility that provides the attachment content handling services processes the selected attachment document to generate attachment data according to the attachment content handling option, and any applicable sub-options, and sends the attachment data to the mobile device 100.

The native application attachment handling option allows the user to view the generated attachment data using the native application that corresponds to the selected attachment document. For example, if the given attachment document is a Microsoft Word™ document or an Adobe Acrobat™ file, the user can receive and "open" the corresponding attachment data using Microsoft Word™ or Adobe Acrobat™ respectively. The user can then view, delete, edit or otherwise modify, and save the attachment data.

The client-server attachment content handling option uses a client-server model in which a "thin client" resides on the mobile device 100 and a "fatter server" resides in the remote facility that provides the attachment content handling services. The remote facility converts the selected attachment document to a smaller, thinner format from which the attachment data is generated and sent to the mobile device 100. In some cases the format can be a text format, which can be further compacted when generating the attachment data. The "thinner format" is a format that is more optimized for at least one of transmission to and viewing on the mobile device 100. For example, in some cases, the selected attachment document can be converted to text. An attachment content viewer 140 can then be used to view the attachment data that is in the optimized format. The attachment content viewer 140 is capable of displaying various types of structured data other than plain text. For example, tables (Excel support) and images can be viewed as described in European Patent Application Nos. 04104474.4 and 05102485.9 which are both hereby incorporated by reference.

The attachment content handling module 138 provides flexibility to the user of the mobile device 100 since some users may prefer to use either one of the attachment content handling options depending on the content or the file type of the selected attachment document. The attachment content handling module 138 and the attachment handling options will be described in further detail below.

The mobile device 100 further includes a device state module 142, an address book 144, a Personal Information Manager (PIM) 146, and other modules 148. The device state module 142 provides persistence, i.e. the device state module 142 ensures that important device data is stored in persistent memory, such as the flash memory 108, so that the data is not lost when the mobile device 100 is turned off or loses power.

The address book 144 provides information for a list of contacts for the user. For a given contact in the address book, the information can include the name, phone number, work address and e-mail address of the contact, among other information. The other modules 148 may include a configuration module (not shown) as well as other modules that can be used in conjunction with the SIM/RUIM interface 128.

The PIM 146 includes functionality for organizing and managing data items of interest to a subscriber, such as, but not limited to, e-mail, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Additional applications may also be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
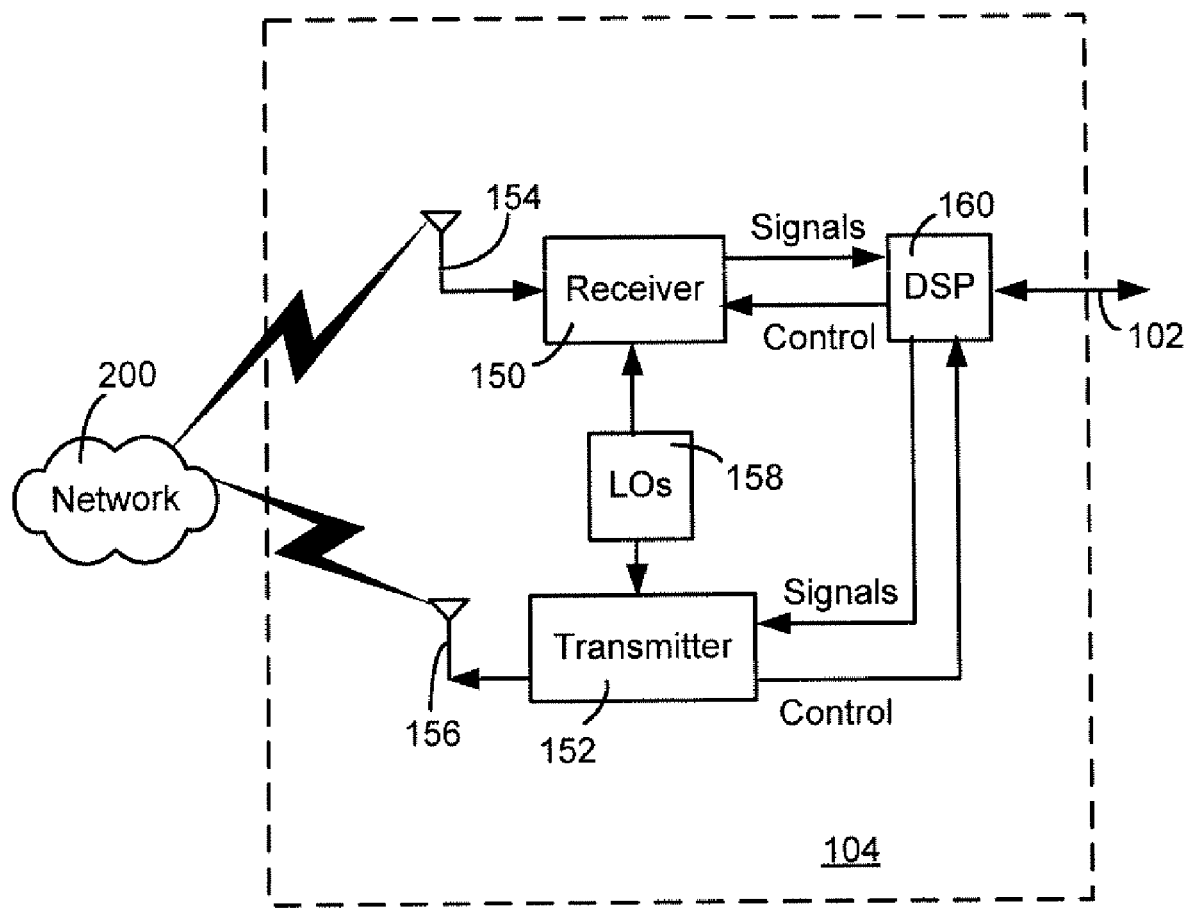
FIG. 2 is a block diagram of a communication subsystem component of the mobile communication device of FIG. 1.

Referring now to FIG. 2, a block diagram of the communication subsystem component 104 of FIG. 1 is shown. The communication subsystem 104 comprises a receiver 150 and a transmitter 152, as well as associated components such as one or more embedded or internal antenna elements 154, 156, Local Oscillators (LOs) 158, and a processing module such as a Digital Signal Processor (DSP) 160. As will be apparent to those skilled in the field of communications, the particular design of the communication subsystem 104 is dependent upon the communication network with which the mobile device 100 is intended to operate. Thus, it should be understood that the design illustrated in FIG. 2 serves only as one example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and transmitter 152 can be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100. Accordingly, when the mobile device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 3:
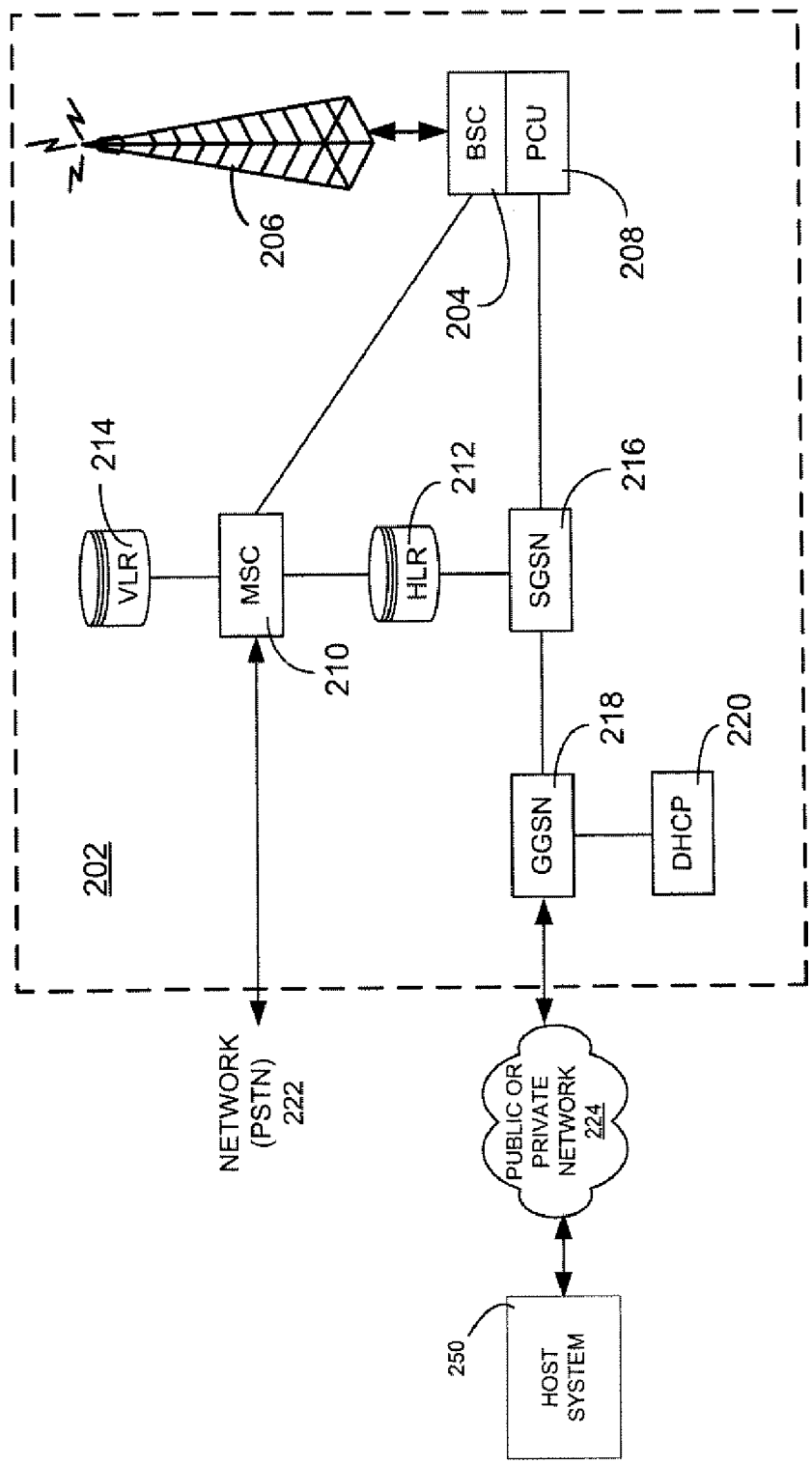

Referring now to FIG. 3, a block diagram of an exemplary implementation of a node of the wireless network 200 is shown as 202. In practice, the wireless network 200 comprises one or more nodes 202. The mobile device 100 communicates with the node 202. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the wireless network 200.

In a GSM network, the MSC 210 is coupled to the BSC 204 and to a landline network, such as a Public Switched Telephone Network (PSTN) 222 to satisfy circuit-switching requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, the BSC 204 also contains a Packet Control Unit (PCU) 208 that connects to the SGSN 216 to control segmentation, radio channel allocation and to satisfy packet switched requirements. To track mobile device location and availability for both circuit switched and packet switched management, the HLR 212 is shared between the MSC 210 and the SGSN 216. Access to the VLR 214 is controlled by the MSC 210.

The station 206 is a fixed transceiver station. The station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. The communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time require less use of computing resources.

The SGSN 216 and GGSN 218 are elements added for GPRS support; namely packet switched data support, within GSM. The SGSN 216 and MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 to be connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from the mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the wireless network 200, insofar as each mobile device 100 must be assigned to one or more APNs and the mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) contexts and there are a limited number of these available in the wireless network 200. To maximize use of the PDP Contexts, the wireless network 200 will run an idle timer for each PDP Context to determine if there is a lack of activity. When the mobile device 100 is not using its PDP Context, the PDP Context can be de-allocated and the IP address returned to the IP address pool managed by the DHCP server 220.

Figure 4:
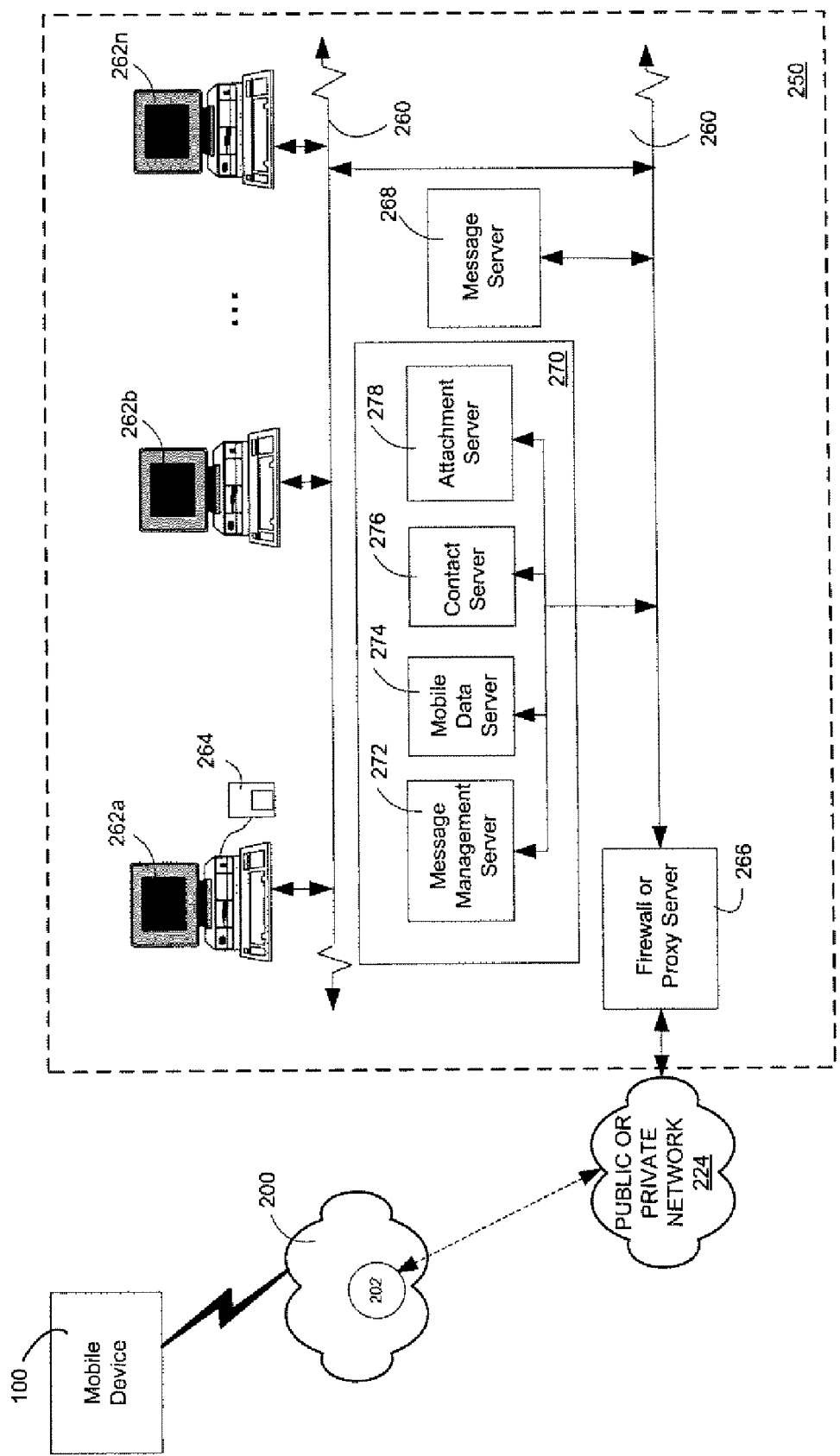

Referring now to FIG. 4, shown therein is a block diagram illustrating components of an exemplary configuration of a host system 250. In one instance, the host system 250 can be a corporate enterprise. The host system 250 will typically be a corporate office or other local area network (LAN), but may also be a home office computer system or some other private system, for example, in variant implementations. In the example shown in FIG. 4, the host system 250 is depicted as a LAN of an organization to which a user of the mobile device 100 belongs. Typically, a plurality of mobile devices can communicate wirelessly with the host system 250 through one or more nodes 202.

The host system 250 comprises a number of network components connected to each other by LAN connections 260. For instance, a user's desktop computer 262*a* with an accompanying cradle 264 for the user's mobile device 100 is situated on a LAN connection. The cradle 264 for the mobile device 100 can be coupled to the computer 262*a* by a serial or a Universal Serial Bus (USB) connection, for example. Other user computers 262*b*-262*n* can also be situated on the LAN 260, and each may or may not be equipped with an accompanying cradle 264 that is suitable for a mobile device. The cradle 264 facilitates the loading of information (e.g. PIM data, private symmetric encryption keys to facilitate secure communications between the mobile device 100 and the host system 250, etc) from the user computer 262*a* to the mobile device 100, and may be particularly useful for bulk information updates often performed in initializing the mobile device 100 for use. The information downloaded to the mobile device 100 may include certificates used in the exchange of messages.

It will be understood by persons skilled in the art that the user computers 262*a*-262*n* will typically also be connected to other peripheral devices, such as printers, etc. which are not explicitly shown in FIG. 4. Furthermore, only a subset of network components of the host system 250 are shown in FIG. 4 for ease of exposition, and it will be understood by persons skilled in the art that the host system 250 can include additional components that are not explicitly shown in FIG. 4 for this exemplary configuration. More generally, the host system 250 may represent a smaller part of a larger network (not shown) of the organization, and may comprise different components and/or be arranged in different topologies than that shown in the exemplary embodiment of FIG. 4.

In this exemplary embodiment, the mobile device 100 communicates with the host system 250 through node 202 of the wireless network 200 and a shared network infrastructure 224 such as a service network provider or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server.

In some implementations, the host system 250 can include a wireless VPN router (not shown) to facilitate data exchange between the host system 250 and the mobile device 100. The wireless VPN router allows a VPN connection to be established directly through a specific wireless network to the mobile device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 100 in this alternative implementation.

Messages intended for a user of the mobile device 100 are initially received by a message server 268 of the host system 250. Such messages may originate from any number of sources. For instance, a message may have been sent by a sender from the computer 262*b* within the host system 250, from a different mobile device (not shown) connected to the wireless network 200 or to a different wireless network, or from a different computing device or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 may comprise multiple message servers 268. The message server 268 may also be adapted to provide additional functions beyond message management, including the management of data associated with calendars and task lists, for example.

When messages are received by the message server 268, they are typically stored in a data store associated with the message server 268. In some embodiments, the data store may be a separate hardware unit (not shown) that the message server 268 communicates with. Messages can be subsequently retrieved and delivered to users by accessing the message server 268. For instance, an e-mail client application operating on a user's computer 262*a* may request the e-mail messages associated with that user's account stored on the data store associated with the message server 268. These messages are then retrieved from the data store and stored locally on the computer 262*a*. The data store associated with the message server 268 can store copies of each message that is locally stored on the mobile device 100. Alternatively, the data store associated with the message server 268 can store all of the messages for the user of the mobile device 100 and only a smaller number of messages can be stored on the mobile device 100 to conserve memory. For instance, the most recent messages (in the past two to three months for example) can be stored on the mobile device 100.

When operating the mobile device 100, the user may wish to have e-mail messages retrieved for delivery to the handheld. An e-mail client application operating on the mobile device 100 may also request messages associated with the user's account from the message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 100 is assigned its own e-mail address, and messages addressed specifically to the mobile device 100 are automatically redirected to the mobile device 100 as they are received by the message server 268.

To facilitate the wireless communication of messages and message-related data between the mobile device 100 and components of the host system 250, a number of wireless communication support components 270 may be provided. In at least some implementations, the wireless communication support components 270 can include a message management server 272, a mobile data server 274, a contact server 276, an attachment server 278, and the like.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the mobile device 100. The message management server 272 also facilitates the handling of messages composed on the mobile device 100, which are sent to the message server 268 for subsequent delivery.

For example, the message management server 272 may monitor the user's "mailbox" (e.g. the message store associated with the user's account on the message server 268) for new e-mail messages, and apply user-definable filters to new messages to determine if and how the messages are relayed to the user's mobile device 100. The message management server 272 may also compress and encrypt new messages (e.g. using an encryption technique such as Data Encryption Standard (DES) or Triple DES) and push them to the mobile device 100 via the shared network infrastructure 224 and the wireless network 200. The message management server 272 may also receive messages composed on the mobile device 100 (e.g. encrypted using Triple DES), decrypt and decompress the composed messages, re-format the composed messages if desired so that they will appear to have originated from the user's computer 262*a*, and re-route the composed messages to the message server 268 for delivery.

Certain properties or restrictions associated with messages that are to be sent from and/or received by the mobile device 100 can be defined (e.g. by an administrator in accordance with IT policy) and enforced by the message management server 272. These may include whether the mobile device 100 may receive encrypted and/or signed messages, minimum encryption key sizes, whether outgoing messages must be encrypted and/or signed, and whether copies of all secure messages sent from the mobile device 100 are to be sent to a pre-defined copy address, for example.

The message management server 272 may also be adapted to provide other control functions, such as only pushing certain message information or pre-defined portions (e.g. "blocks") of a message stored on the message server 268 to the mobile device 100. For example, in one instance, when a message is initially retrieved by the mobile device 100 from the message server 268, the message management server 272 may push only the first part of a message to the mobile device 100, with the part being of a pre-defined size (e.g. 2 KB). The user can then request more of the message, to be delivered in similar-sized blocks by the message management server 272 to the mobile device 100, possibly up to a maximum pre-defined message size. Accordingly, the message management server 272 facilitates better control over the type of data and the amount of data that is communicated to the mobile device 100, and can help to minimize potential waste of bandwidth or other resources.

The mobile data server 274 encompasses any other server that stores information that is relevant to the corporation. The mobile data server 274 may include, but is not limited to, databases, online data document repositories, customer relationship management (CRM) systems, or enterprise resource planning (ERP) applications.

The contact server 276 can provide information for a list of contacts for the user in a similar fashion to the address book 144 on the mobile device 100. Accordingly, for a given contact, the contact server 276 can include the name, phone number, work address and e-mail address of the contact, among other information. The contact server 276 can also provide a global address list that contains the contact information for all of the contacts associated with the host system 250.

The attachment server 278 can process an attachment content handling request that is sent by the mobile device 100. The attachment content handling request can include a native attachment content handling request and a client-server attachment content handling request. In either case, the attachment content handling request includes an indication of a selected attachment document that requires processing. In order for the attachment server 278 to be able to find the selected attachment document, the attachment content handling request can also include an indication of the message that was received by the mobile device 100 that the selected attachment document is associated with. The attachment server 278 can then interact with at least one of the message server 268 and the message management server 272 as well as any associated data stores to obtain the selected attachment document.

Once the attachment server 278 obtains a copy of the selected attachment document, the attachment server 278 processes the selected attachment document to generate attachment data. The attachment server 278, in conjunction with at least one of the message server 268 and the message management server 272 then sends the attachment data through the firewall 266 and at least one of the networks 200 and 224 to the mobile device 100.

For native application attachment content handling requests, the attachment server 278 can obtain the selected attachment document and send the full document as the attachment data to the mobile device 100. The user can then view the attachment data using the native application on the mobile device 100. For instance, in some embodiments, the mobile device 100 can include the Microsoft Office™ applications, in which case the attachment server 278 can retrieve full WORD™, EXCEL™ or POWER POINT™ documents and send the document as the attachment data to the mobile device 100 for viewing. In some embodiments, the mobile device 100 can include ADOBE ACROBAT™ or an image viewer in which case the attachment server 278 can send PDF documents, JPEG documents, TIFF documents or other types of image files that are supported by the image viewer to the mobile device 100 for viewing.

For client-server attachment content handling requests, the attachment server 278 processes the selected attachment document to produce an optimized format that is more suitable for at least one of transmission and viewing on the mobile device 100. The attachment data is then generated based on the optimized format. There can be several options for a client-server attachment content handling request. In any of these cases, once the attachment data is received at the mobile device 100, the attachment content viewer 140 can be used to view the attachment data.

In some embodiments, the client-server attachment content handling request indicates that the full version of the selected attachment document is to be converted to text. This client-server attachment content handling option is referred to as the text conversion option. In these cases, the attachment server 278 converts the entire document to text, generates the attachment data based on the text and then sends the attachment data to the mobile device 100. For example, the attachment server 278 may receive a client-server attachment content handling request for EXCEL or POWER POINT attachment documents. The attachment server 278 renders attachment documents of these file types to text and then generates the attachment data based on the text.

In some embodiments, the client-server attachment content handling request indicates that only certain data associated with the selected attachment document is required. For instance, the selected attachment document can be a text file for which a table of contents is requested. In these cases, the attachment server 278 processes the selected attachment document to generate a table of contents and sends the table of contents as the attachment data to the mobile device 100. This client-server attachment content handling option is referred to as the table of contents entry option. Some exemplary implementations are described in U.S. patent application Ser. No. 10/693,736 which is hereby incorporated by reference.

In some embodiments, the attachment content handling request may indicate that only one or more desired sections of the given attachment document is required. In these cases, the attachment server 278 processes the selected attachment document to generate the attachment data based on the desired section(s) and then sends the attachment data to the mobile device 100. This client-server attachment content handling option is referred to as the retrieve section option.

It will be understood by persons skilled in the art that the message management server 272, the mobile data server 274, the contact server 276 and the attachment server 278 need not be implemented on separate physical servers within the host system 250. For example, some or all of the functions associated with the message management server 272 may be integrated with the message server 268, or some other server in the host system 250. Furthermore, the host system 250 may comprise multiple message management servers 272, particularly in variant implementations where a large number of mobile devices need to be supported. Furthermore, in some embodiments, the functionality of the attachment server 278 may be provided by another corporate server that can provide additional functionality. Further, in some embodiments, the functionality of the attachment server 278 can be provided by a third party. In some cases, the remote facility can also be associated with a website accessible by the Internet. In any of these cases, the attachment server 278 or the third party services can be referred to as a remote attachment service.

Figure 5A:
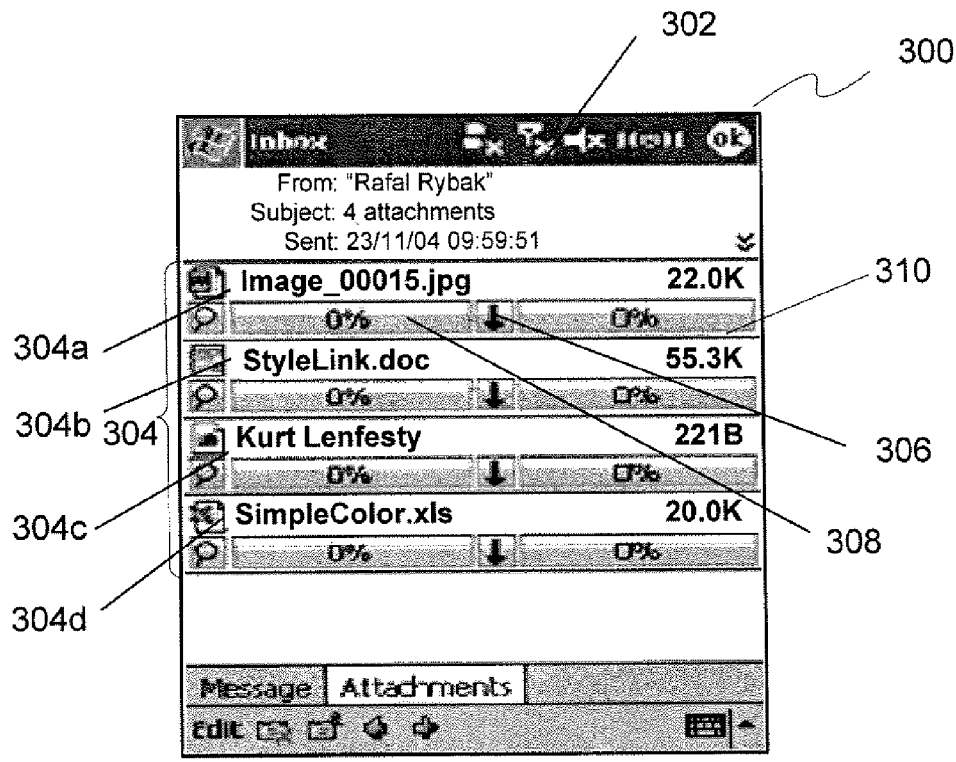
FIG. 5*a* is an illustration of an exemplary embodiment of an attachment screen that is provided by an attachment content handling module of the mobile communication device of FIG. 1.

Referring now to FIG. 5a, shown therein is an illustration of an exemplary embodiment of an attachment screen 300 that can be provided by the attachment content handling module 138 in conjunction with the message application 136 of the mobile device 100. The attachment screen 300 is one example of an attachment content handling means that can be provided by the attachment content handling module 138 allows the user of the mobile device 100 to see the list of attachment documents associated with a received message, provides the user with an option to select one of the attachment documents, and provides the user with an option to select an attachment content handling option for the selected attachment document. In this exemplary embodiment, the attachment content handling option includes the client-server attachment content handling option and the native application attachment content handling option.

In this example, the attachment screen 300 includes a header information field 302, which provides information related to a received e-mail message with associated attachment documents. The information can include the name of the sender of the e-mail message, the subject of the e-mail message, the number of attachment documents, and the time and date that the e-mail was sent. The attachment screen 300 can also include an attachment list 304 that lists the attachment documents associated with the e-mail message. In this example, there are 4 attachment documents 304a, 304b, 304c, and 304d. The attachment screen 300 may display the name of each attachment document, the size of each attachment document and a corresponding attachment icon indicating the file type of the attachment document. For example, Microsoft WORD™ and EXCEL™ attachment documents can have the WORD™ and EXCEL™ application icons respectively located beside the filenames of these attachment documents. In some embodiments, only application document file types that are supported by the mobile device 100 and/or the attachment server 278 will display the respective icons and unsupported attachment document file types will have a generic or unsupported icon.

The attachment screen 300 presents the user with an input option 306 for selecting between the different attachment content handling options. In this example, the input option 306 can be accessed by a thumb wheel. In other embodiments, the input option 306 can be selected by pressing a particular key from the keyboard 116 or by another input means provided by the auxiliary I/O 112. Other embodiments of the attachment screen 300 may enable touch-screen selection (i.e., by use of stylus) of attachment content handling options for the documents 304a-d, or other tabs, icons or other input mechanisms.

In this example, the attachment content handling options include: 1) a native application attachment content handling option for downloading attachment data for a selected attachment document to the mobile device 100 and using the corresponding native application to view or edit the attachment data; 2) a client-server attachment content handling option for downloading attachment data based on an optimized version (e.g., text, XML, or HTML) of a selected attachment document to the mobile device 100 and using the attachment content viewer 140 to view and possibly modify the attachment data; and 3) setting a default attachment content handling option that can be used for all attachment documents associated with the current e-mail or with any e-mail that is received by the mobile device 100.

The attachment screen 300 can also include a status or progress bar that shows the progress for an attachment content handling option. The progress bar can indicate the amount of time remaining for generating and downloading the attachment data or the percentage of the attachment document that has been converted to attachment data and downloaded. In some embodiments, the progress bar can indicate only the amount of time remaining or the percentage of the attachment data that remains to be downloaded. Alternatively, in some embodiments, the progress bar may first indicate the progress of generating the attachment data and then indicate the progress of downloading the attachment data. An icon, color or text message can be displayed in the status bar to indicate whether the attachment data is being generated or downloaded. In this exemplary embodiment, there are two progress bars 308 and 310 that represent attachment processing progress for the native application attachment content handling option and the client-server attachment content handling option, respectively.

Figure 5B:
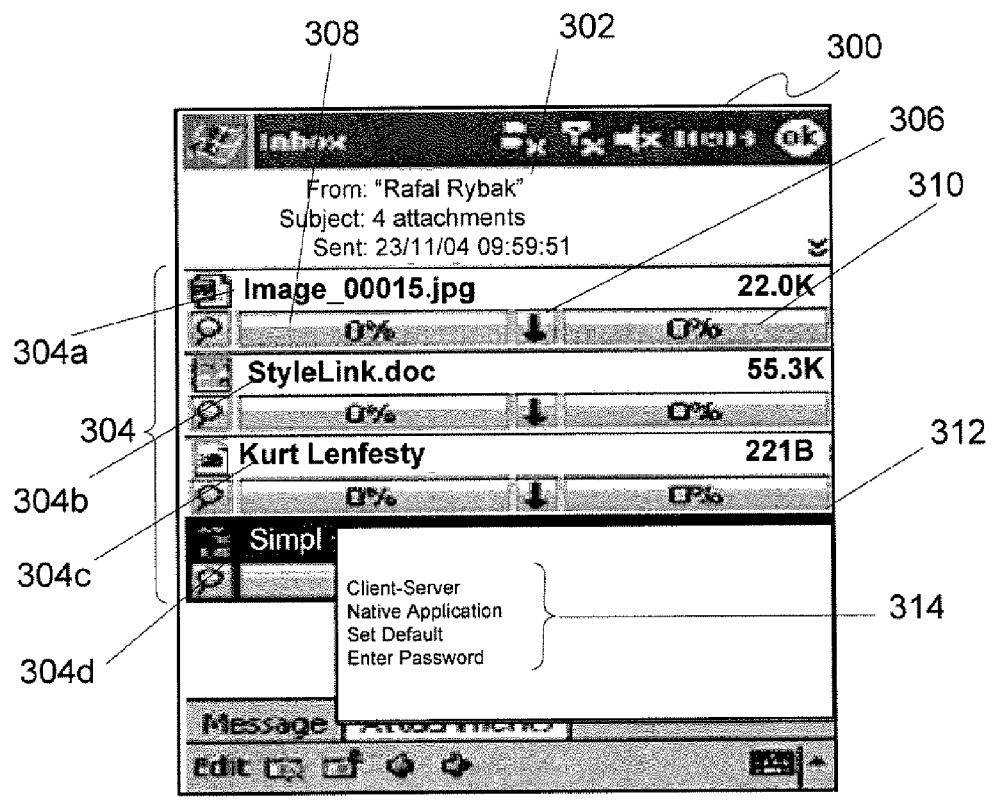
FIG. 5*b* is an illustration of exemplary menu choices for selecting a desired attachment content handling option for viewing an attachment document.

When a user has accessed the attachment content handling option 306 for a given attachment document, an attachment content handling menu 312 can be displayed that provides several options 314 as shown in FIG. 5b. These options include whether to download the attachment data using the client-server attachment content handling option or using the native application attachment content handling option. Another option that may be included is an enter password option that is available for attachment documents for which the user must enter a password in order to be able to download the corresponding attachment data. This option applies to attachment documents that are password protected.

In some implementations, for each attachment document, the graphical user interface for the menu that provides the attachment content handling options can include two columns (i.e. one column for the client-server handling option, and the other column for the native application attachment content handling option). Each column allows the user to quickly select the preferred attachment content handling option for a desired attachment document. Options that do not apply are disabled (for example, when the attachment document is too big to download or if there's no support for the client-server attachment handling option).

Figure 5C:
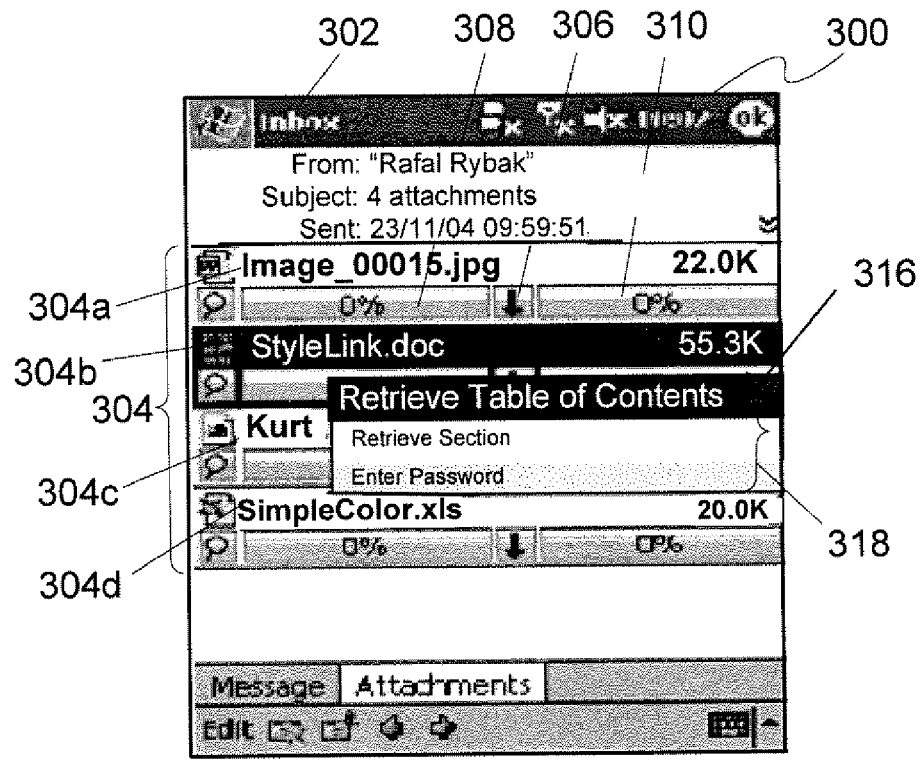
FIG. 5*c* is an illustration of exemplary menu choices when a user chooses to retrieve an attachment document using a client-server attachment content handling option.

Referring now to FIG. 5c, shown therein is an illustration of an exemplary embodiment of a client-server menu 316 with corresponding menu choices 318 that appear when a user chooses to retrieve a selected attachment document using the client-server attachment content handling option. In this example, the menu choices include retrieving the table of contents for the selected attachment document, and retrieving one or more sections of the selected attachment document. In this example, the selected attachment document does not have a password associated with it so the option to enter a password is not available.

These menu options can change depending on the state of the attachment data. For example, initially one may see the options: 'Retrieve Table of Contents, Retrieve Section, and Enter Password'. In some cases, once the user selects a menu option, it can be removed from the list of menu options.

Once the user selects a choice for the client-server attachment content handling option, the client-server attachment progress bar 308 is highlighted and the progress is incrementally updated (i.e. as a percentage of the total file size) until the attachment data is retrieved. In some cases, retrieval means that the attachment server has converted the given attachment document into the requested optimized format, and that the attachment data has been wirelessly received by the mobile device 100. Once the attachment data has been generated, the user can then view/edit the attachment data using the attachment content viewer application 140 on the mobile device 100.

Figure 5D:
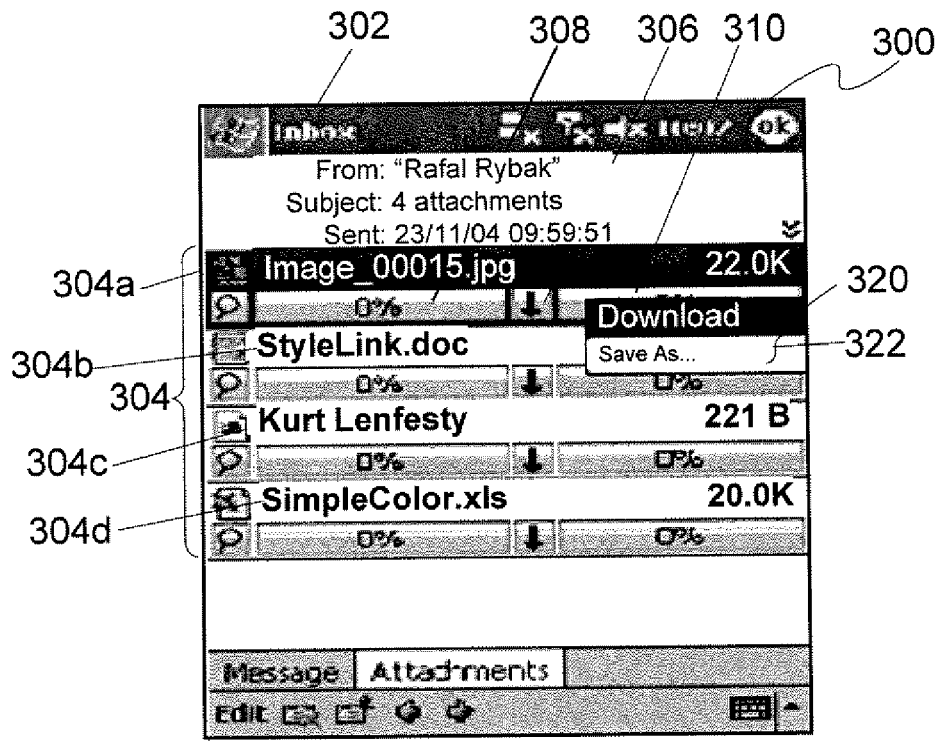
FIG. 5*d* is an illustration of exemplary menu choices when a user chooses to retrieve an attachment document using a native application attachment content handling option; and, FIG. 6 is a flow chart diagram illustrating an exemplary embodiment of an attachment content handling method.

Referring now to FIG. 5d, shown therein is an illustration of an exemplary embodiment of a native application menu 320 with menu choices 322 that appear when a user chooses to retrieve an attachment document using the native application attachment content handling option. The native application menu 320 appears if the mobile device 100 supports the native application associated with the selected attachment document. The menu 320 has the options of downloading the selected attachment document as is, or downloading the selected attachment document and saving it under another file name. In some cases, the 'Save As . . . ' option is enabled once the attachment has been downloaded. The 'Save As . . . ' option allows the user to select a location and filename to save the attachment data within the local device storage.

To see the menu, the user can perform a 'show menu' action which can be implemented in several ways. For example, in some implementations, the show menu action can be triggered when the user highlights a desired attachment document. In addition, in some implementations, the user may have the ability to perform a 'default' action. One example of a default action can be to download the attachment document if the attachment document has not already been downloaded or to view the attachment document using the associated native application if the attachment document has been downloaded. Viewing can mean saving the attachment data in the local store silently (i.e., much like 'Save As . . . ' except no dialog is shown to the user) and then launching the native application.

When the native application attachment content handling option is selected, the download status of the file attachment can be indicated by the native download progress bar 308. When downloading the attachment data associated with the selected attachment document, the download status can also be incrementally updated (i.e. as a percentage of the total size of the attachment data) until the attachment data is fully downloaded onto the mobile device 100. At this point, the downloaded attachment data can be displayed using the native application at which point the user can then view, possibly modify and then save, or delete the attachment data.

In certain embodiments, the native application attachment content handling option may not be permissible if the native application does not reside on the mobile device 100 or if the format of the given attachment document is not known. In other cases, the client-server attachment content handling option may not be permissible if the attachment server 278 does not support conversion for the file type of the selected attachment document or if the file format of the selected attachment document is not known.

In the example of FIG. 5, the file type for the attachment document 304c (i.e. "Kurt Lenfesty") is not known, thus the attachment content handling module 138 will not allow the user to download this attachment document using either the native application or client-server attachment content handling options. In this case, a popup message or dialog box can be displayed by the attachment content handling module 138 to notify the user that the native application or client-server attachment content handling options are not available for this selected attachment document. Alternatively, the native application and client-server attachment content handling options can be "greyed out" in the attachment content handling option menu 312 if the user tries to access the input option 306 associated with the attachment document 304c.

In some embodiments, to handle cases in which the user knows the file type of a selected attachment document with an unrecognized file format, the attachment content handling module 138 can provide the user with the option to enter the file type of the selected attachment document. The attachment content handling module 138 can then determine whether the native application and client-server attachment content handling options are available for the file type entered by the user.

In general, when a menu choice is not available, the menu choice can be greyed-out in the menu or otherwise have a different appearance than the menu choices that are available for selection. In addition, the presentation of menu choices can be context sensitive; i.e. certain menu choices can only appear based on a variety of parameters, including, but not limited to, settings for the selected attachment document, the file type of the selected attachment document, settings in the native attachment application, settings in the content viewer application 140, etc.

Figure 6:
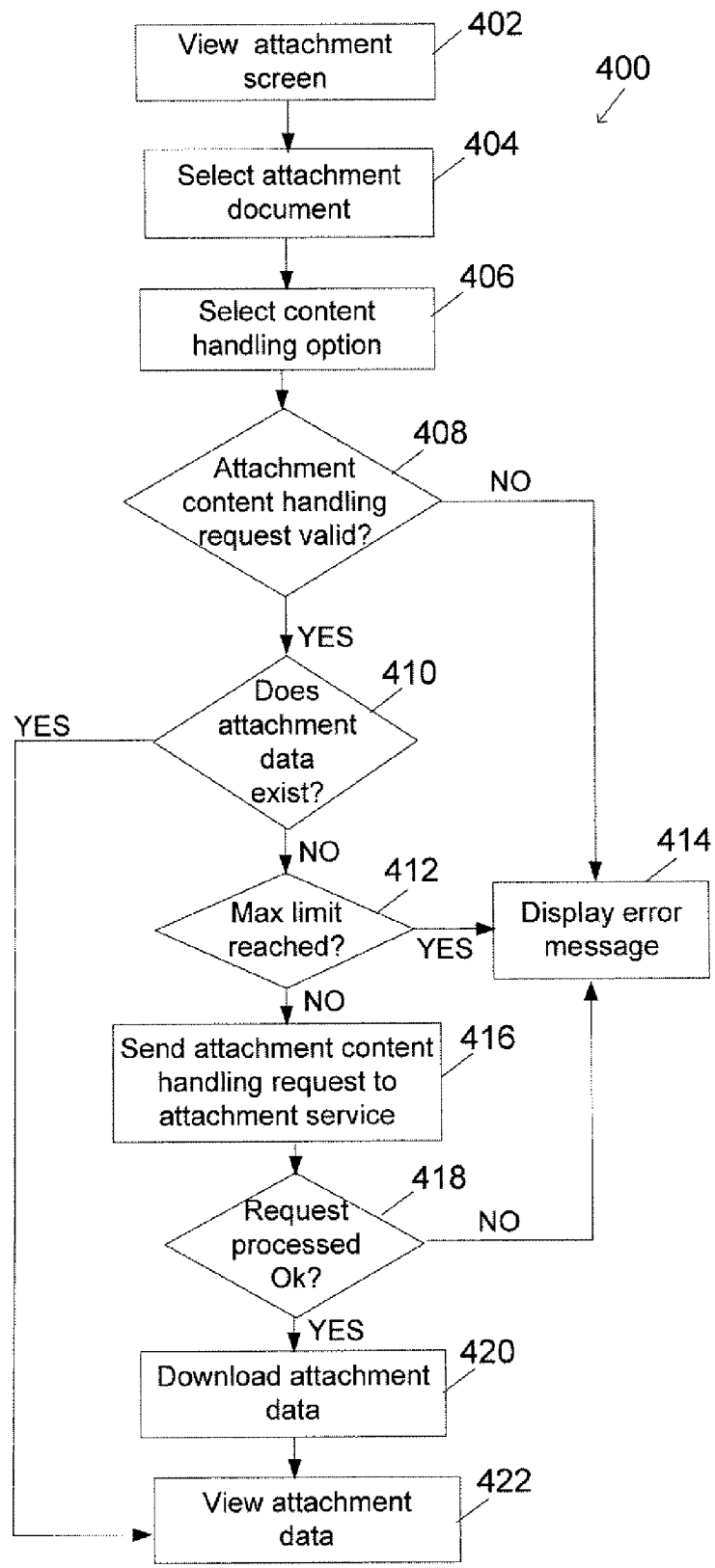

Referring now to FIG. 6, shown therein is a flow chart diagram illustrating an exemplary embodiment of an attachment content handling method 400. The attachment handling method 400 begins when the user chooses to view a list of the associated attachment documents for a message that has been received at the mobile device 100. In some embodiments, the attachment list can be displayed via the attachment screen 300. The user then views the attachment list in step 402 and is provided with an option for selecting one of the associated attachment documents. At step 404, the user selects an attachment document for downloading. At step 406, the user is provided with an option to select an attachment content handling option, which includes the native application and client-server attachment content handling options. At this step, the user selects the attachment content handling option and can be provided with further options to specify further choices for each handling option as was shown in FIGS. 5c and 5d.

At step 408, the method 400 then verifies whether the selected attachment document and the selected attachment content handling option form a valid attachment processing request. For instance, the method 400 determines whether the attachment server 278 can process the selected attachment document according to the attachment content handling option. The method 400 further determines whether the attachment data that will be generated can be viewed on the mobile device via the attachment content viewer 140 or the native application that corresponds to the selected attachment document. If the method 400 verifies that the attachment processing request can be executed without error, the method 400 moves to step 410. Otherwise the method 400 moves to step 414 at which point an error message is displayed to the user. In some embodiments, the processing done at step 408 can be done after step 404 so that the user will not be able to select a content handling option if it is not available for the selected attachment document.

At step 410, the method 400 determines whether attachment data corresponding to the selected attachment document and the selected attachment content handling option exists on the mobile device 100. If corresponding attachment data exists on the mobile device 100, then the method 400 moves to step 422 at which the attachment data is viewed using either the attachment content viewer 140 or a corresponding native application. This depends on the format of the attachment data. Otherwise, if attachment data corresponding to the selected attachment document and the selected attachment content handling option does not exist on the mobile device 100, then the method 400 moves to step 412.

At step 412, the method 400 determines whether a maximum file size limit has been reached on the mobile device 100. For certain mobile devices and/or networks, there is a size limit on the amount of data that can be downloaded wirelessly onto the device. If such a limit is reached, no further data can be transmitted or received. It is prudent to conduct this check, at step 412, to ensure that the mobile device 100 is able to receive the attachment data and not exceed this limit prior to sending an attachment content handling request to a remote attachment service. If the maximum file size limit is reached, or will be reached while the attachment data is being downloaded, then the method moves to step 414 and an appropriate error message is displayed to the user. One possible alternative is for the mobile device 100 to increase the limit or delete unnecessary stored files before proceeding. However, if it is determined that the maximum file size limit will not be reached by downloading the attachment data, then the method 400 moves to step 416 at which the attachment content handling module 138 generates and sends the attachment content handling request to the remote attachment service.

At step 418, the remote attachment service processes the attachment content handling request. If the attachment content handling request is processed successfully, then the generated attachment data is downloaded at step 420. The attachment data can then be viewed at step 422 using either the native application that corresponds to the selected attachment document or the attachment content viewer. This will depend on the nature of the attachment data and the attachment content handling option selected by the user. If the attachment content handling request is not processed successfully at step 418, then the method 400 moves to step 414 at which point an appropriate error message is displayed to the user.

In some embodiments, the attachment content handling module 138 can provide additional features such as providing the user with a default setting option to configure a default setting for the attachment content handling option. This is advantageous if the user prefers to use one of the attachment content handling options whenever it is available for a selected attachment document. The default setting for the attachment content handling option can be based on the file type of the selected attachment document, the native applications that are supported by the mobile device 100, or the file types that are supported by the attachment server 278. For example, the user may configure the attachment content handling module 138 to use the client-server attachment content handling option for all Adobe Acrobat™ files and to use the native application attachment content handling option for all Microsoft Word™ documents because the mobile device 100 may support all Word™ documents, but not Acrobat™ files.

In some embodiments, to download selected attachment documents more quickly, the user may set the default setting for the attachment content handling option to download all selected attachment documents using the client-server attachment content handling option whenever the client-server attachment content handling option is available for a selected attachment document. In addition, the user may configure the attachment content handling module 138 to enable automatic switching to a non-preferred attachment content handling option if the default-preferred attachment content handling option does not exist for a selected attachment document. For example, if the user has set the default attachment content handling option to the client-server attachment content handling option and the user receives a file (e.g. a JPEG image) that is not supported by this handling option, but is supported by the native application attachment content handling option, then the attachment content handling module 138 can automatically switch to the native application attachment content handling option to download and view the selected attachment document.

The default setting for the attachment content handling option and/or automatically switching to an alternate attachment content handling option may pertain to all attachment documents within a specific e-mail message or to all e-mail messages received on the mobile device 100. In some embodiments, the default setting for the attachment content handling option can be set using the attachment content handling menu 312. In some embodiments, the default setting for the attachment content handling option can be set using another input option that is provided by the attachment content handling menu 138. In some embodiments, further parameters can be set for the default attachment content handling option. For example, one of the attachment content handling options can be used whenever it is available for a selected attachment document and also when the selected attachment document has a file size that is under or over a certain limit.

In any of these cases, when a default setting is set for attachment content handling, the user simply selects an attachment document and the content handling module 138 automatically generates the attachment content handling request based on the default setting. This can be done according to the rules just described.

Further, it should be understood that the phrase "providing the user with an option" covers any interface that is provided to the user to allow the user to make a choice for an option, such as which attachment document to select, which attachment content handling module to select, whether to configure a default setting, and the like.

Embodiments described herein provide a user with at least one option for downloading a selected attachment document that is associated with a message received on a mobile device.

In one aspect, at least one embodiment described herein provides a method for allowing a user of a mobile device to retrieve attachment data when a message having an indication of one or more associated attachment documents is received on the mobile device. The method comprises:

a) providing the user with a first option to select an attachment document from the one or more associated attachment documents;

b) providing the user with a second option to select an attachment content handling option for a selected attachment document, the attachment content handling option including a native application attachment content handling option and a client-server attachment content handling option;

c) generating an attachment content handling request including an indication of the selected attachment document and the selected attachment content handling option;

d) sending the attachment content handling request to a remote attachment service that generates the attachment data for the selected attachment document in accordance with the attachment content handling option; and, e) receiving the attachment data from the remote attachment service.

In at least some cases, the method further includes providing the user with a default setting option for the attachment content handling option.

In at least some cases, the method further includes automatically selecting an alternate attachment content handling option when the default setting for the attachment content handling option is not available for the selected attachment document.

In at least some cases, the method further includes providing the user with an additional default setting option to configure the default setting based on at least one of: a file type of the selected attachment document, and a file size of the selected attachment document.

In at least some cases, after step (e), the method further includes loading a native application that corresponds to the selected attachment document to display the attachment data when the user selects the native attachment content handling option.

In at least some cases, after step (e), the method further includes loading an attachment content viewer to display the attachment data when the user selects the client-server attachment content handling option.

In at least some cases, at the remote attachment service, for the client-server attachment content handling option, the method further includes converting the selected attachment document to an optimized format if the selected attachment document is text-based.

In at least some cases, for the client-server attachment content handling option, the method further includes providing the user with a third option for selecting one of: a retrieve table of contents option, and a retrieve section option.

In another aspect, at least one embodiment described herein provides a computer program product for allowing a user of a mobile device to retrieve attachment data when a message having an indication of one or more associated attachment documents is received on the mobile device, the computer program product comprising a computer readable medium embodying program code means executable by a processor of the mobile device for implementing the attachment content handling method as specified above.

In yet another aspect, at least one embodiment described herein provides a mobile communication device that allows a user of a mobile device to retrieve attachment data when a message having an indication of one or more associated attachment documents is received on the mobile device. The mobile communication device comprises a main processor for controlling the operation of the mobile communication device; a communication subsystem connected to the main processor, the communication subsystem being adapted for wirelessly sending and receiving data; a message application that interfaces with the communication subsystem to send and receive messages, and to receive the attachment data from a remote attachment service; and, an attachment content handling module for providing the user with a first option to select an attachment document from the one or more associated attachment documents, providing the user with a second option to select an attachment content handling option for a selected attachment document, the attachment content handling option including a native application attachment content handling option and a client-server attachment content handling option, and wherein the attachment content handling module generates and sends an attachment content handling request to the remote attachment service for generating the attachment data, the attachment content handling request including an indication of the selected attachment document and the selected attachment content handling option.

In at least some cases, the attachment content handling module provides the user with a third option to set a default setting for the attachment content handling option.

In at least some cases, the attachment content handling module is adapted to automatically select an alternate attachment content handling option when the default setting is not available for the selected attachment document.

In at least some cases, the attachment content handling module provides the user with a fourth option to configure the default setting based on at least one of: a file type of the selected attachment document, and a file size of the selected attachment document.

In at least some cases, the device further includes an attachment content viewer for displaying the attachment data when the user selects the client-server attachment content handling option.

In at least some cases, the device further includes a native application for displaying the attachment data when the user selects the native application attachment content handling option.

In at least some cases, for the client-server attachment content handling option, the attachment content handling module provides the user with a fifth option to select one of: a retrieve table of contents option, and a retrieve section option.

In yet another aspect, at least one embodiment described herein provides a system for allowing a user of a mobile device to retrieve attachment data when a message having an indication of one or more associated attachment documents is received on the mobile device. The system comprises a mobile device that receives the message, the mobile device including: a main processor for controlling the operation of the mobile device; a communication subsystem connected to the main processor, the communication subsystem being adapted for wirelessly sending and receiving data; a message application that interfaces with the communication subsystem to send and receive messages, and to receive the attachment data from a remote attachment service; and, an attachment content handling module for providing the user with a first option to select an attachment document from the one or more associated attachment documents, providing the user with a second option to select an attachment content handling option for a selected attachment document, the attachment content handling option including a native application attachment content handling option and a client-server attachment content handling option, and the attachment content handling module being adapted to generate and send an attachment content handling request to the remote attachment service for generating the attachment data, the attachment content handling request including an indication of the selected attachment document and the selected attachment content handling option. The system further includes a remote attachment service wirelessly coupled to the mobile device for processing the attachment processing request and providing the attachment data to the mobile device.

In at least some cases, the remote attachment service converts the selected attachment document to an optimized format for the client-server attachment content handling option if the selected attachment document is text-based.

In at least some cases, the remote attachment service is provided by an attachment server associated with one of a corporate enterprise and a website.

In at least some cases, the attachment content handling module provides the user with a third option to set a default setting for the attachment content handling option.

In at least some cases, the mobile device further includes an attachment content viewer for displaying the attachment data when the user selects the client-server attachment content handling option.

It should be understood that various modifications can be made to the embodiments described and illustrated herein, without departing from the embodiments, the general scope of which is defined in the appended claims. Further, while the embodiments are described for a mobile device, the embodiments are generally applicable to any communication or computing device that can download attachment documents.

The invention claimed is:

1. A method of retrieving data of an attachment document of a message, wherein acts of the method are executable by a processor of a mobile device, the method comprising:
displaying, at the mobile device, an attachment content handling option for the attachment document, wherein the message has been received at the mobile device but the attachment document has not been received at the mobile device, wherein the attachment content handling option comprises both a native application attachment content handling option and a client-server attachment content handling option;
generating an attachment content handling request comprising an indication of the attachment document and a selected attachment content handling option;
sending the attachment content handling request to a remote attachment service;
if the selected attachment content handling option is the native application attachment content handling option, then receiving data of the attachment document, from the remote attachment service, in a format viewable using a native application on the mobile device; and
if the selected attachment content handling option is the client-server attachment content handling option, then receiving data of the attachment document, from the remote attachment service, in a format optimized for at least one of transmission to and viewing on the mobile device.

2. The method of claim 1, further comprising providing an option to set a default setting for the attachment content handling option.

3. The method of claim 2, further comprising automatically selecting an alternate attachment content handling option when the default setting for the attachment content handling option is not available for the attachment document.

4. The method of claim 2, further comprising determining the default setting based on at least one of: a file type of the attachment document, and a file size of the attachment document.

5. The method of claim 1, wherein if the selected attachment content handling option is the native application attachment content handling option, loading the native application to display the data of the attachment.

6. The method of claim 1, wherein if the selected attachment content handling option is the client-server attachment content handling option, loading an attachment content viewer to display the data of the attachment.

7. The method of claim 1, wherein if the selected attachment content handling option is the client-server attachment content handling option, providing a retrieve table of contents option, wherein the data of the attachment document received from the remote attachment service comprises a table of contents where the retrieve table of contents option is selected.

8. The method of claim 1, wherein if the selected attachment content handling option is the client-server attachment content handling option, providing a retrieve section option, wherein the data of the attachment document received from the remote attachment service comprises a section of the attachment where the retrieve table of contents option is selected.

9. The method of claim 1, further comprising providing an attachment content handling menu from which one of the client-server attachment content handling option and the native application attachment content handling option is selected.

10. The method of claim 9, wherein the attachment content handling menu comprises at least a first column and a second column, wherein user-selectable menu choices related to the client-server handling option are provided in the first column, and wherein user-selectable menu choices related to the native application attachment content handling option are provided in the second column.

11. A mobile device comprising a processor, wherein the processor is configured to:
    display, at the mobile device, an attachment content handling option for an attachment document of a message, wherein the message has been received at the mobile device but the attachment document has not been received at the mobile device, wherein the attachment content handling option comprises both a native application attachment content handling option and a client-server attachment content handling option;
    generate an attachment content handling request comprising an indication of the attachment document and a selected attachment content handling option;
    send the attachment content handling request to a remote attachment service;
    if the selected attachment content handling option is the native application attachment content handling option, then receive data of the attachment document, from the remote attachment service, in a format viewable using a native application on the mobile device; and
    if the selected attachment content handling option is the client-server attachment content handling option, then receive data of the attachment document, from the remote attachment service, in a format optimized for at least one of transmission to and viewing on the mobile device.

12. The device of claim 11, wherein the processor is further configured to provide an option to set a default setting for the attachment content handling option.

13. The device of claim 12, wherein the processor is further configured to automatically select an alternate attachment content handling option when the default setting for the attachment content handling option is not available for the attachment document.

14. The device of claim 12, wherein the processor is further configured to determine the default setting based on at least one of: a file type of the attachment document, and a file size of the attachment document.

15. The device of claim 11, wherein the processor is further configured to, if the selected attachment content handling option is the native application attachment content handling option, load the native application to display the data of the attachment.

16. The device of claim 11, wherein the processor is further configured to if the selected attachment content handling option is the client-server attachment content handling option, load an attachment content viewer to display the data of the attachment.

17. The device of claim 11, wherein the processor is further configured to, if the selected attachment content handling option is the client-server attachment content handling option, provide a retrieve table of contents option, and wherein the data of the attachment document received from the remote attachment service comprises a table of contents where the retrieve table of contents option is selected.

18. The device of claim 11, wherein the processor is further configured to, if the selected attachment content handling option is the client-server attachment content handling option, provide a retrieve section option, and wherein the data of the attachment document received from the remote attachment service comprises a section of the attachment where the retrieve table of contents option is selected.

19. The device of claim 11, wherein the processor is further configured to provide an attachment content handling menu from which one of the client-server attachment content handling option and the native application attachment content handling option is selected.

20. The device of claim 19, wherein the attachment content handling menu comprises at least a first column and a second column, wherein user-selectable menu choices related to the client-server handling option are provided in the first column, and wherein user-selectable menu choices related to the native application attachment content handling option are provided in the second column.

* * * * *